May 23, 1933. K. DÜRR 1,910,214
AUTOMATIC MACHINE FOR PRODUCING SPRING RING CASINGS
Filed Feb. 7, 1931 3 Sheets-Sheet 1
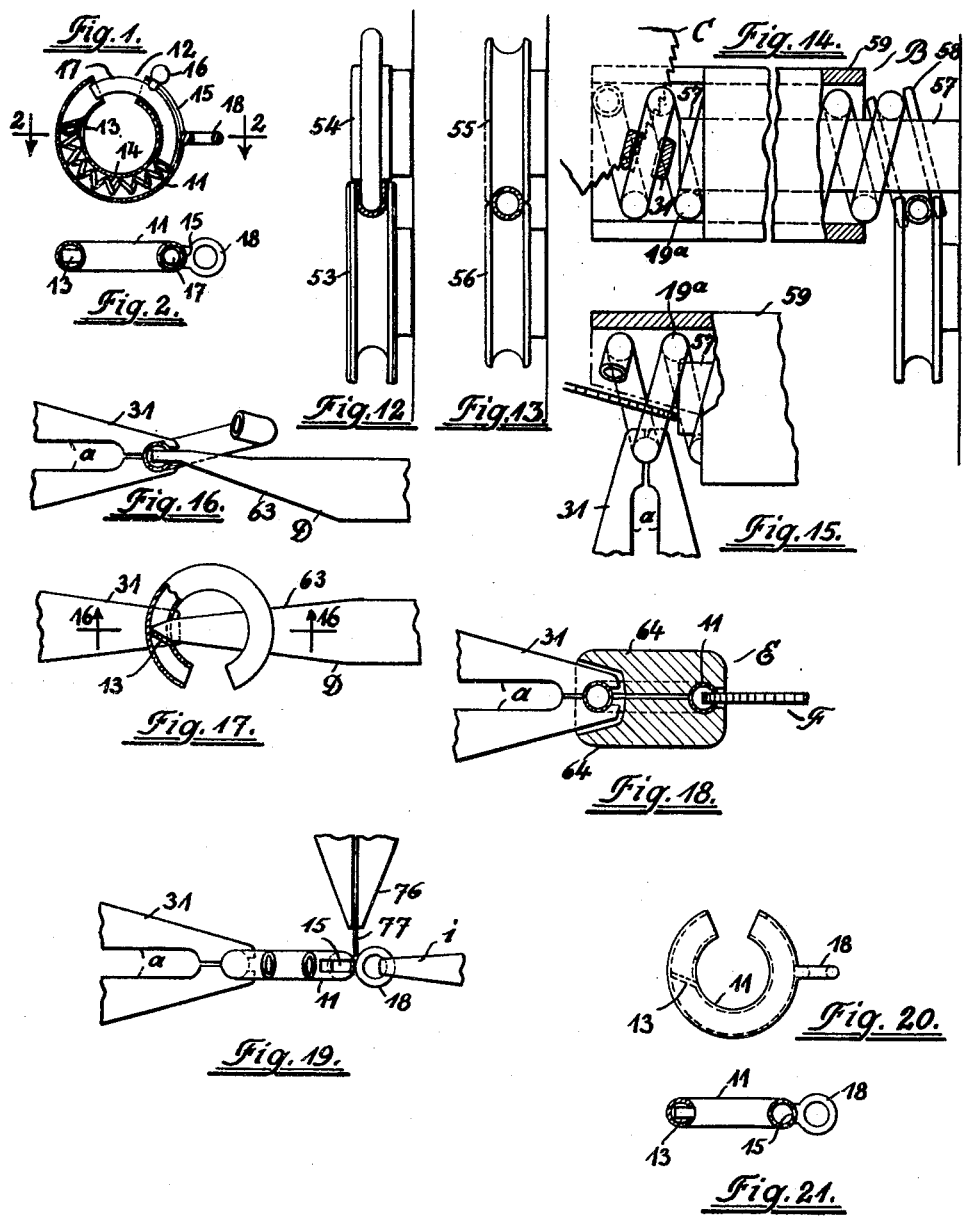

May 23, 1933.  K. DÜRR  1,910,214
AUTOMATIC MACHINE FOR PRODUCING SPRING RING CASINGS
Filed Feb. 7, 1931   3 Sheets-Sheet 2
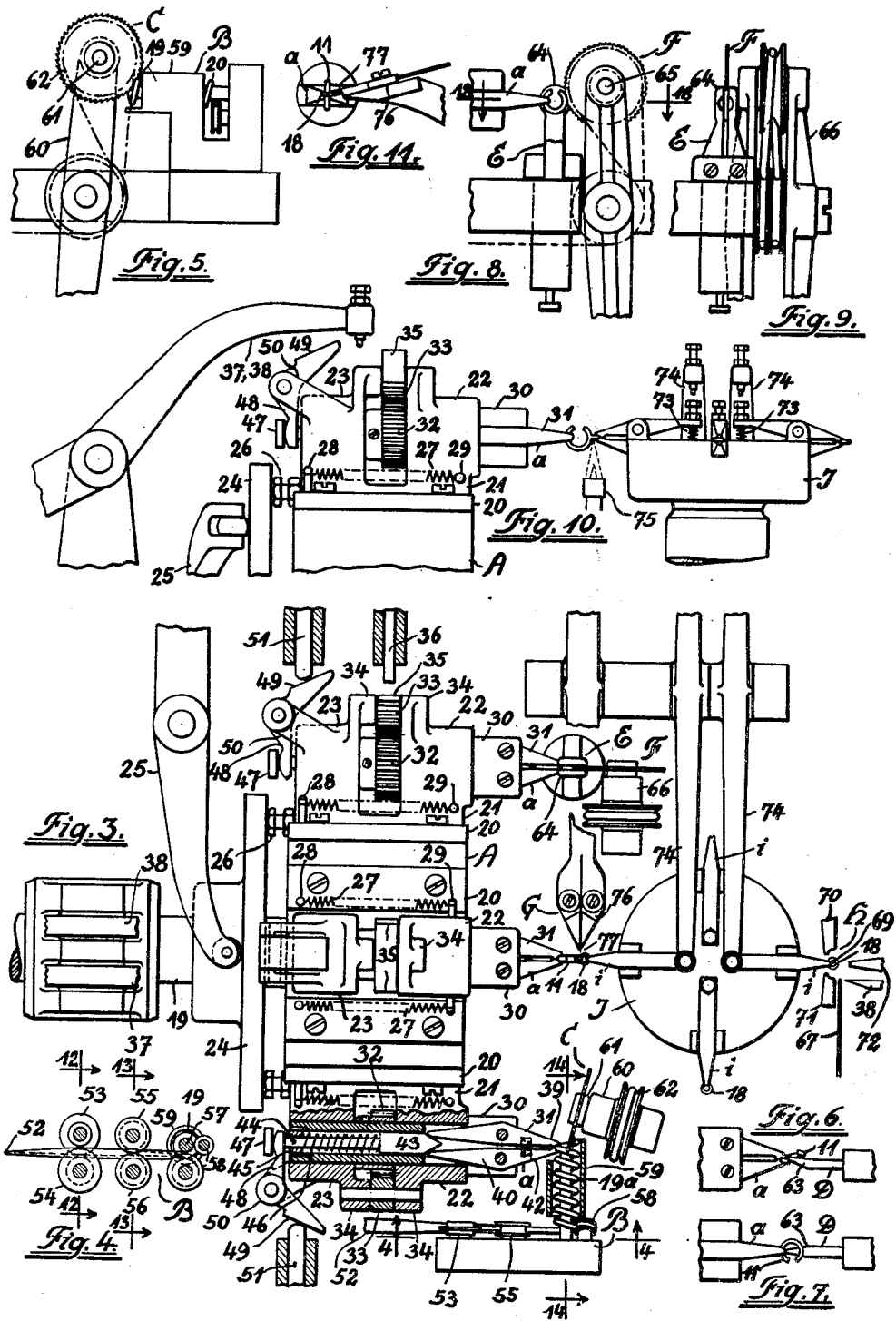

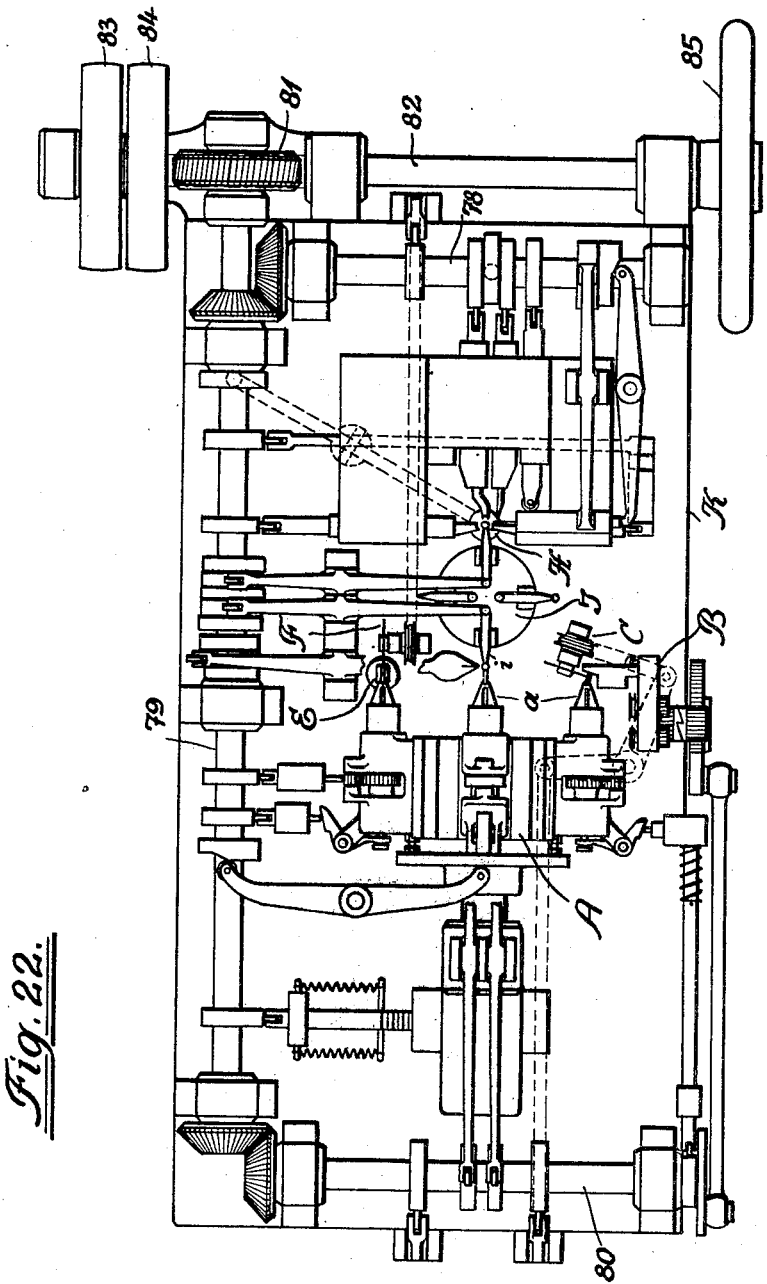

Patented May 23, 1933

1,910,214

UNITED STATES PATENT OFFICE

KARL DÜRR, OF PFORZHEIM, GERMANY

AUTOMATIC MACHINE FOR PRODUCING SPRING RING CASINGS

Application filed February 7, 1931, Serial No. 514,198, and in Germany February 13, 1929.

This invention relates to an automatic machine for producing spring ring casings, that is casings in the shape of an open hollow ring provided near one end with an internal abutment for a spring to be inserted in the hollow ring, at the other end with a longitudinal slot around the external circumference for the knob of a curved slide guided in the hollow ring and closing its aperture, and near the rear end of the slot with a soldered on circular eye. Such spring ring casings were hitherto produced in four separate operations on separate devices. This was very inconvenient, wasted time and was not economical, especially in the case of small rings.

By means of the device hereinafter described, the spring ring casing is produced in a continuous operation.

The machine according to the invention consists of a device for producing and working a hollow ring, of a further device for producing the circular eye, a device for feeding and holding the eye on the hollow ring, and a soldering device for uniting the two elements.

The device for producing the hollow ring is composed for example of a group of separate devices and tools, arranged in a circle at distances of 90° apart and of a tonghead with axially directed tongs, arranged within the circle and fed periodically through 90°. The group of separate devices and tools comprises (1) a device for producing a tube spiral from band metal and a circular saw for cutting off a hollow ring length from the tube spiral, (2) a tool for producing the abutment in the hollow ring, (3) pressing tongs for pressing flat the hollow ring hitherto of spiral shape and a circular saw for cutting the longitudinal slot in the hollow ring and, (4) a soldering device. The tonghead serves for holding the hollow ring and bringing it from one tool to the others.

The device for producing the eye can consist of one of the devices known on machines for producing decorative chains and chain mail. The device for feeding and holding the eye on the hollow ring consists of a second tonghead provided with four radially directed tongs and also periodically rotatable through 90°.

By these arrangements, cooperating at uniform speed, the hollow ring and the eye are produced separately and the two parts finally soldered together so that the spring ring casing is made absolutely automatically.

An embodiment of the invention is illustrated by way of example in the accompanying drawings in which:

Figs. 1 and 2 show a complete spring ring,

Fig. 1 being a section through the central plane of the spring ring and

Fig. 2 a cross section in the direction of arrows 2—2 of Fig. 1.

Figs. 3 to 7 show diagrammatically the device for producing the spring ring casing, Fig. 3 showing the entire device in top plan view.

Fig. 4 showing in elevation the device for producing the tube spiral,

Fig. 5 showing in side elevation the device for cutting off the hollow ring,

Fig. 6 showing in front elevation the device for producing the abutment.

Fig. 7 is a top plan view of Fig. 6.

Fig. 8 shows in elevation the device for pressing flat the hollow ring and producing the longitudinal slot.

Fig. 9 is a side elevation of Fig. 8.

Fig. 10 shows in elevation the device for holding together the hollow ring and the eye and for soldering same.

Fig. 11 is a side elevation of a portion of Fig. 10.

Figs. 12 to 21 show the production of the spring ring casing in various phases on an enlarged scale.

Fig. 12 shows the conversion of the metal band into U-shaped cross section according to line 12—12 of Figs. 3 and 4.

Fig. 13 shows the conversion of the metal band into a tube in cross section according to lines 13—13 in Figs. 3 and 4.

Fig. 14 shows the production of the tube spiral in cross section according to the direction arrows 14, 14 of Fig. 3.

Fig. 15 shows in top plan view the cutting off of the hollow ring.

Fig. 16 shows the production of the abutment in cross section on lines 16, 16 of Fig. 17.

Fig. 17 is a top plan view of Fig. 16.

Fig. 18 shows the pressing flat of the hollow ring and the sawing of the longitudinal slot in cross section on lines 18, 18 of Fig. 8.

Fig. 19 shows in top plan view the holding together and soldering of the hollow ring and the eye.

Fig. 20 is an elevation of the finished hollow ring casing.

Fig. 21 is a cross section of Fig. 20.

Fig. 22 is a diagrammatic view showing the general arrangement of the machine.

The driving mechanisms of the entire device and of the individual devices are not described and illustrated, as these driving mechanisms consist of combinations of generally known mechanical elements, such as pulleys, shafts, cam discs, levers, rods, racks, toothed wheels, claw clutches and the like, and a description thereof would render the specification unnecessarily long. Moreover, for producing the movements, various combinations of such mechanical elements are employed, the choice of which is left to the manufacturer of the device. By this limitation to the essential features of the device, these are more easily understood and clearer.

The article to be produced is a ring casing of a spring ring (Figs. 1 and 2). This spring casing consists of a hollow ring interrupted by a gap 12, having an inwardly pressed abutment 13 near one of its ends on the internal circumference for a pressure spring to be inserted in the hollow ring 11, a longitudinal slot 15 on the outer circumference near its other end, serving as guide for the press knob 16 of a carrier closing element shiftable in the hollow ring 11 and closing the gap 12 and a ring eye 18 soldered near the rear end of the slot.

In the example of the machine illustrated devices or tools are arranged separately or in groups around a tonghead A periodically rotatable through 90° around a horizontal axle 19 and carrying four axially directed tongs, the devices or tools being arranged at the stopping points of the tongs a. The device B for producing the tube spiral 19a, and the circular saw C for cutting off a hollow ring length 11 from the tube spiral 19a, are arranged at the first stopping point, the tool D for producing the internal abutment 13 at the second stopping point, the pressing tongs E for pressing flat the hollow ring 11 and the circular saw F for sawing the longitudinal slot 15 at the third stopping point and the soldering device G at the fourth stopping point. The device H for producing the ring eye 18 is arranged in axial direction laterally to the soldering device G. The second tonghead J is periodically rotatable through 90° around a vertical axle 22 between the soldering device G and the producing device H for the eye 18, this head being provided with four radially directed tongs i.

The tonghead A is rigidly mounted on its vertically arranged axle 19, periodically rotatable through a quarter revolution. It carries on its circumference four axially directed guides 20, in each of which a slide 21 is longitudinally shiftable with two coaxial bearings 22, 23 connected by the slide. The movement to the right according to Figs. 3 and 4 is effected by a disc 24, axially movable on the axle 19 of the tonghead A by the action of a lever 25 and bearing by means of adjusting screws 26 on the rear end of the slides 21.

The movement to the left is effected by pull strings 27, which are tensioned between two pins 28 and 29 on the tonghead A and on the slide 21 respectively. Sleeve-shaped turrets 30 for tongs 31, transversely slotted at their front end, are rotatably mounted in the bearings 22, 23. Each turret 30 carries on its circumference, between the bearings 22, 23, a toothed portion 32, in which a toothed segment 33 engages. These toothed segments are oscillatable in bearing extensions 34 of the bearings 22 and provided with shoulders 35, on which a slide 36 arranged at the stopping point III and two levers 37 and 38 arranged above the stopping point IV act.

The tongs a consist each of two two-armed lever-shaped tongarms 39, 40, the front arms 39 of which are opened by an interposed pressure spring 42 and closed by a wedge 43 entering between the rear arms 40. The wedge 43 is mounted in the sleeve-shaped part of the turret 30, and a rearwardly directed shank 44 on the wedge 43 is journaled longitudinally movable in a screw threaded part 45 joining the rear end of the holder sleeve 30. A pressure spring 46, guided on the shank 44 and clamped between the screw threaded part 45 and the wedge 43, forces this latter forwards between the rear tongarms 40. A disc 47 is mounted on the rear end of the shank 44. An elbow-shaped two-armed lever 48, 49 oscillatable in a bearing extension 50 on the rear bearing 23 by means of a slide 51 moved against its arm 48, bears with its other arm 49 against the front side of the disc 47 and thus pushes back the wedge 43 so that the tongs a open. All four tongs a of the tonghead A are constructed in like manner and are fed successively to the individual devices and tools B to G by the quarter revolutions of the tonghead A.

The device B is arranged in front of the first stopping point and serves for producing the tube spiral 19a from band metal 52 and comprises two pairs of shaping rolls 53, 54 and 55, 56 the lower roll 53 of the first pair 53, 54 having a U-shaped depression, the counter roll 54 a corresponding raised portion, whereas each roll of the second pair of rolls 55, 56 has a semicircular depression around its circumferences. This device B also comprises a winding mandrel 57, an obliquely directed counter roll 58 on the circumference of the winding mandrel 57 and a guide sleeve 59 arranged around the latter. The shaping rolls 53 to 56 and the winding mandrell 57 with counter roll 58 are rotated intermittently so that the band metal 52 fed between these parts 53 to 58 is bent to U-shaped cross section (Fig. 7) between the first pair of rolls 53, 54 and then shaped to a tube (Fig. 8) between the second pair of rolls 55, 56, which tube is then wound on the winding mandrell 57 to form a tube spiral 19 by the counter roll 58, this tube spiral 19 being guided by the sleeve 59.

The intermittent turning of the shaping elements 53 to 58 is such that about five sixths of a winding of the tube spiral 19 is screwed out in front of its guide sleeve 59. The end of the tube spiral 19 projecting from the sleeve 59 is gripped by the tongs $a$, situated at this point. This is effected in that, by the forward movement of the slide 51, the lever 48, 49 is oscillated, the wedge 43 pulled back and the tongs $a$ are opened so that they drop a finished spring ring casing. The slides 21 are then moved forward by the oscillation of the lever towards the right together with the tongs mounted in their bearings in the holders, the tongs $a$ in question gripping from the sides over the end of the tube spiral 19. Finally, by the return movement of the slide 51, the lever 48, 49 is swung back, the wedge 43 forced by the spring 42 between the rear tongarms 40 and the tongs $a$ are thus closed.

In front of the free end of the hollow wire spiral 19 the circular saw C is arranged perpendicularly to the upper end winding of the tube spiral 19. The bearing 60 of the circular saw C is constructed as a lever, oscillatable parallel to the plane of this saw, so that the circular saw C can reciprocate towards the tube spiral 19. The circular saw C is driven by a rope pulley 62, mounted on its axle 61. By means of the circular saw C the projecting portion of the tube spiral 19 comprising about five-sixths of a complete winding and held by the tongs $a$, is cut off as a hollow ring 11. By means of the subsequent return movement of the holding tongs $a$ and the quarter revolution of the tonghead A, the blank 11 is brought to a stand still in front of the tool D. This is a stationary pin 63 bent upwards to about the central axis of the tongs $a$. The circumference of the blank 11 is guided against this pin 63, as the tongs pass by, and the abutment 13 is thus pressed therein.

By means of a further backward movement of the tongs $a$ and the turning of the tonghead A, the blank 11 is brought within the range of the tools E and F. The tool E consists of pressing tongs, similarly constructed and operated as the holding tongs $a$. As the holding tongs move forwards the blank 11 comes between the jaws 64 of the pressing tongs E, said jaws being provided with annular grooves. By the closing of the tongs E and simultaneous turning of the holding tongs $a$ by means of a slide 36, the hollow ring 11 is pressed from its former spiral-like shape into the shape of a plane ring.

A further circular saw F is arranged in the direction of the central plane of the pressing tongs E, the jaws of which do not completely close, the axle 65 of this saw F being also carried in a bearing 66 formed as an oscillatable lever. The circular saw F is driven by a rope pulley. During the movement of the saw against the blank 11 still held in the pressing tongs E, the longitudinal slot 15 is sawn into its circumference, after which the pressing tongs E open.

Owing to the tongs $a$ being again moved back and the turning of the tonghead A, the blank 11 comes at the fourth stopping point within the range of the soldering tool G, where, through the action of the lever 37 upon the toothed segment 33, the tongs $a$ are turned and the blank 11 is brought into vertical position.

The device H for producing the ring eye 18 may be of any desired type according to whether the ring eye 18 is produced by winding a wire on a mandrel and cutting off of each wire winding or by bending a periodically fed and cut off length of wire around a bending mandrel by means of bending tools or in any other manner known from machines for producing chains and chain mail. In the example illustrated the feed wire 67, a knife 68, a bending mandrel 69 and three longitudinally movable bending tools 70 to 72 surrounding a ring mould are indicated, by means of which the wire length 67 is first bent in U-shape and then formed to an eye 18.

The tonghead J has four radially directed tongs $i$ on its surface, is rotatable periodically through a quarter of a revolution and adapted to be raised and lowered. The tongs $i$ are closed by the action of springs 73 and opened by levers 74. A ring eye 18 which has just been formed is gripped by the closing of the tongs $i$, brought to the soldering device H by the rising of the tonghead J and stepwise rotation of the same and presented to the hollow ring 11 held in the upper tongs *a* of the tonghead A which is not vertically shiftable by the descending of the tonghead J.

The soldering device consists of a soldering tube 75, arranged under the hollow ring 11 and the eye 18 held the one against the other, and of a soldering wire feeder 76, which holds the soldering wire 77 at the joint of the two parts 11 and 18 at the moment when these parts are being heated, so that they are soldered together and the spring ring casing is finished. The tongs holding the finished ring is turned through 90° after the eye has been liberated, and opened, so that the finished spring ring casing drops out of the holding tongs during the subsequent quarter revolution of the tonghead and is caught and collected in a suitable manner.

All the mechanisms are arranged on a table K. They are operated by three shafts 78, 79 and 80 arranged along the rear and two side edges of the table K, these shafts being connected by pairs of bevel gears. The shafts carry cams, crank discs or the like and between these and the individual mechanisms, transmission devices are arranged so that all parts move in the manner described. The rear cam shaft 79 is driven through the intermediary of a worm gearing from a main shaft 82 carrying a fast pulley 84 and loose pulley 83 and a hand wheel 85.

I claim:—

1. A machine for producing spring ring cases, comprising in combination a periodically rotatable tonghead having tongs, tools arranged around said tonghead adapted to produce and work a hollow ring from band metal, a device for producing a ring link, a second rotatable tonghead having tongs adapted to each bring a finished ring link to a hollow ring of the tongs on said first tonghead, and a device for soldering the ring link brought by the tongs of said second tonghead to the hollow ring held by the tongs of said first tonghead.

2. A machine for producing spring ring casings, comprising in combination a device for producing a tube spiral from band metal, a circular saw for cutting off a hollow ring length from said tube spiral, a tool for forming an abutment on said hollow ring, pressure tongs for flat pressing said hollow ring, a circular saw for cutting a longitudinal slot in said hollow ring, and a soldering device, all said devices and tools mounted in a circle at 90° apart, a tonghead rotatable stepwise through 90° arranged in said group of devices and tools, axially movable and rotatable tongs on said tonghead, a device for producing ring eyes arranged in axial direction in front of said soldering device, a second tonghead arranged between said soldering device and said eye producing device rotatable stepwise through 90° around a vertical axle, and radially directed tongs on said second tonghead.

3. A machine as specified in claim 2, comprising in combination with the group of tools and devices and the tonghead arranged within said group, four axial guides, slides adapted to move in said guides, axial bearings connected by said slides, a tongholder rotatably mounted in said bearings, a toothed rim on said tongholder between said bearings, a toothed segment meshing with said toothed rim, bearing extensions of said tongholder bearings adapted to allow the oscillation of said toothed segments, shoulders on said toothed segments, and operating parts for said segments adapted to act on said shoulders.

In testimony whereof, I affix my signature.

KARL DÜRR.